United States Patent [19]

Hengst

[11] 4,183,075
[45] Jan. 8, 1980

[54] ILLUMINATION SYSTEM FOR PHOTOGRAPHIC ENLARGERS

[75] Inventor: Alfred Hengst, Wetzlar, Fed. Rep. of Germany

[73] Assignee: Ernst Leitz Wetzlar GmbH, Wetzlar, Fed. Rep. of Germany

[21] Appl. No.: 897,196

[22] Filed: Apr. 17, 1978

[30] Foreign Application Priority Data

May 4, 1977 [DE] Fed. Rep. of Germany ... 7714074[U]

[51] Int. Cl.² .............................................. G03B 15/02
[52] U.S. Cl. ........................................ 362/6; 362/264; 362/293; 355/71
[58] Field of Search ................... 362/6, 253, 264, 293; 355/71

[56] References Cited
U.S. PATENT DOCUMENTS 3,927,941  12/1975  Yamaguchi ............................ 355/71

Primary Examiner—Stephen J. Lechert, Jr.
Attorney, Agent, or Firm—Gilbert L. Wells

[57] ABSTRACT

Illumination system for photographic enlargers having a chamber mounted between the lamp and the negative aperture and consisting of heat-insulating, non-staining material of high light reflective and scattering power. In addition to the light entry and exit apertures, a further opening has a wall-segment inserted therein for cooling the mixing chamber and this wall segment consists of a material having a greater heat conductivity than the polyalkene foam.

11 Claims, 2 Drawing Figures

ILLUMINATION SYSTEM FOR PHOTOGRAPHIC ENLARGERS

CROSS REFERENCE TO A RELATED APPLICATION

Applicant claims priority under 35 USC 119 for application G 77 14 074.0 filed May 4, 1977 in the Patent Office of the Federal Republic of Germany.

BACKGROUND OF THE INVENTION

The field of the invention is illumination systems for photographic enlargers and the present invention is particularly concerned with multicolor picture enlargers.

The polyalkene and substituted polyalkene foams useful in the present invention are disclosed in Modern Plastics Encyclopedia published by MacGraw Publication Co, New York, N.Y., U.S.A.

It is known to the prior art to mount a mixing chamber preferably immediately before the negative stage for the purpose of uniformly illuminating the negative aperture, so that the light upon multiple reflections leaves the aperture as diffuse light as disclosed in U.S. Pat. No. 3,927,941 of Murray H. Simon. Such a chamber is simultaneously used in multicolor picture enlargers to achieve intensive color mixing.

Light-mixing boxes made of polystyrene foam have been found to be especially advantageous, because they are highly efficient for reflection and scattering. However, such boxes suffer from the drawback of heating up greatly in the presence of the contemporary conventional high output halogen lamps which act as point sources of light and heat. Furthermore these boxes create an undesired localization of heat barrier (high temperature) in the negative aperture. Again, the polystyrene material suffers from this concentrated heat after the equipment is used for longer periods. Such a light mixing box is disclosed in U.S. Pat. No. 3,897,147 of Haruki Yamaguchi.

To meet such shortcomings, a heat filter has been inserted into the beam after the lamp as disclosed in U.S. Pat. No. 3,831,021 of Leopold Muhlosser. But such filters are costly and affect the red region of the spectrum, which is important in color equipment, thereby also affecting the intensity of radiation. This in turn requires a filter correction in the color mixing section with ensuing loss of light. Therefore longer exposures are required. Another possible approach to prevent overheating the mixing box would be to use additional plates in front of it as disclosed in U.S. Pat. No. 3,897,147 of Murray H. Simon, but this approach too fails to eliminate the localization of heat and also causes loss of light.

SUMMARY OF THE INVENTION

Having in mind the limitations of the prior art, it is an object of the present invention to produce equipment permitting higher thermal loading while lowering the temperature in the negative aperture.

It is a further object of the present invention to have no variation in the color temperature unfavorably influencing the exposure time. To that end an illumination system for enlargers is disclosed, in which the light-mixing chamber is mounted between the lamp and the negative plane and is made of heat insulating, non-staining material of high reflective and scattering power which for instance may consist of polyalkene or substituted polyalkene foam. In addition to the light entry and exit apertures the mixing chamber comprises a further opening into which is inserted a wall-segment used to cool the mixing chamber. The wall segment consists of a material with higher thermal conductivity than that of the material, the mixing chamber is made from. Preferably this wall-segment consists of metal such as aluminum, magnesium, brass or copper, and is provided with cooling fins on its outside.

The wall segment appropriately extends across the entire side opposite the light entry aperture and covers at least the area of incidence of the entering beams.

In order to achieve optimal light mixing, the inside of the wall-segment is adapted to the reflectivity of the other walls. It may be covered with a white matte lacquer to obtain diffuse reflection. However, a partly or fully mirror coated surface suitably directed in part or in whole may also be provided in lieu of the above described surface.

BRIEF DESCRIPTION OF THE DRAWINGS

In the drawings appended hereto an embodiment of the present invention is shown, wherein.

DESCRIPTION OF THE PREFERRED EMBODIMENT

Figure 1:
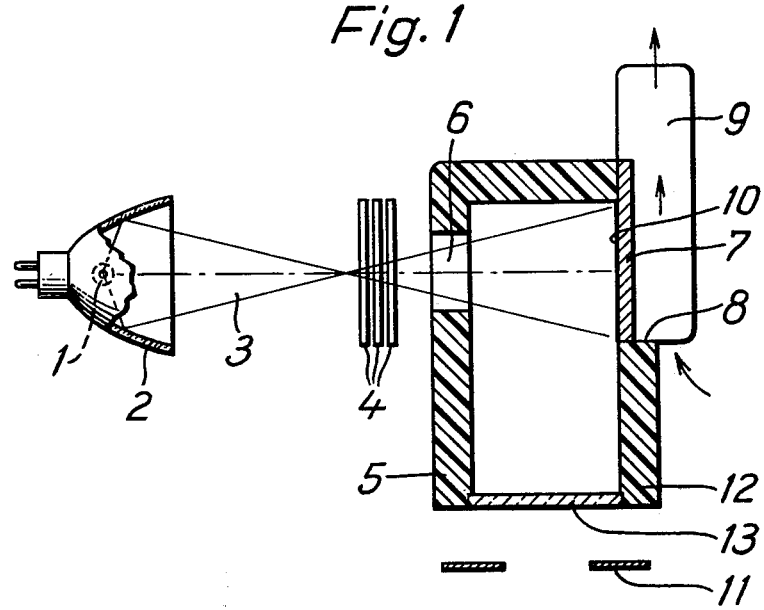
FIG. 1 is a side view of the course of the illuminating beams of a photographic enlarger with the light mixing box of the present invention in cross-section.
Figure 2:
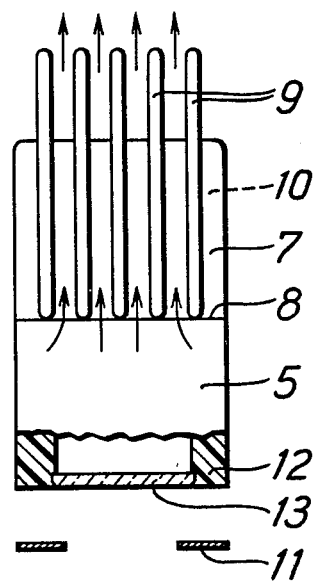
FIG. 2 is a view from the right of FIG. 1 showing the lower part of the wall removed and with the exposed side walls in cross-section.

The beams 3 emitted by halogen lamp 1 and condensed by reflector 2 pass through color filters 4 and into light mixing box 5. They enter through aperture 6 and are incident on metal wall-segment 7 mounted in opening 8. Cooling fins 9 are located at the outside, conducting heat away. A white, matte lacquer is deposited on the inside surface 10 of wall-segment 7, the reflectivity of this white lacquer corresponding approximately to the scattering from the remaining wall surfaces of the box made of heat-nonconductive, non-staining material of high light reflective and scattering power as for instance polyalkene foam. The light is multiply reflected inside the box and thus is intensively mixed. The beams leave as diffuse light through transparent cover plate 13 in the bottom of the box and reach negative aperture 11.

Best Mode of Carrying Out the Invention

The illuminating system of the present invention is used in the photographic enlarger as disclosed in U.S. Pat. No. 3,927,491 of Haruki Yamaguchi. The particular polyalkene used in the mixing box 5 is a polyolefin and it is manufactured by DYNAMIT NOBEL AG, Troisdorf, Germany, with the designation TROLEN. The cooling fins 9 are made of copper or aluminum. The white, matte lacquer deposited on the inside surface 10 is made by CETELON, Ditzingen/Stuttgart, Germany, and is designated EB-ACRYL-Einschichtlack 6/10 157.

I claim:

1. An illumination system for photographic enlargers having a lamp, a negative aperture and a light-mixing chamber mounted therebetween, said light-mixing chamber constructed from heat insulating, non-staining material of high light reflective and scattering power and having a front wall with a light entry aperture therein, a bottom wall with a light exit aperture therein and a rear wall with another aperture therein, said another aperture having a wall segment inserted therein for cooling said light-mixing chamber and said wall segment comprised of a material having a greater heat conductivity than said material.

2. The illumination system of claim 1, wherein said wall-segment is made of metal.

3. The illumination system of claim 1, wherein said wall-segment is mounted at the area of incidence of the incoming light beams.

4. The illumination system of claim 1, wherein said wall-segment inserted into said another aperture extends over the entire side opposite said light entry aperture.

5. The illumination system of claim 1, wherein said wall-segment is provided with cooling fins on its outside.

6. The illumination system of claim 1, wherein said wall-segment is mounted in said another aperture using further insulating means.

7. The illumination system of claim 1, wherein the inside of said wall-segment comprises a diffusely reflecting surface.

8. The illumination system of claim 7, wherein said inside is coated with a white, matte lacquer.

9. The illumination system of claim 1, wherein the inside of said wall-segment is mirror coated.

10. The illumination system of claim 9, wherein the inside surface of said wall-segment is of such geometry and is so treated that its reflectivity corresponds to that of said material.

11. The illumination system of claim 1, wherein said material consists of polyalkene or substituted polyalkene foam.

* * * * *